US012755398B2

(12) United States Patent
Van Duijkeren et al.

(10) Patent No.: US 12,755,398 B2
(45) Date of Patent: Oct. 6, 2026

(54) METHOD FOR DETERMINING A TRAJECTORY FOR A MOBILE DEVICE

(71) Applicant: Robert Bosch GmbH, Stuttgart (DE)

(72) Inventors: Niels Van Duijkeren, Kornwestheim (DE); Fabian Gies, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 18/624,752

(22) Filed: Apr. 2, 2024

(65) Prior Publication Data

US 2024/0331167 A1 Oct. 3, 2024

(30) Foreign Application Priority Data

Apr. 3, 2023 (DE) .................... 10 2023 203 060.8

(51) Int. Cl.
*G06T 7/20* (2017.01)
*G05B 13/02* (2006.01)

(52) U.S. Cl.
CPC .............. *G06T 7/20* (2013.01); *G05B 13/021* (2013.01); *G06T 2207/30241* (2013.01)

(58) Field of Classification Search
CPC ................................ G06T 7/20; G06T 13/021
(Continued)

(56) References Cited

U.S. PATENT DOCUMENTS 6,173,215 B1 1/2001 Sarangapani
2003/0076224 A1* 4/2003 Braune .................. F16P 3/144 340/500

(Continued)

FOREIGN PATENT DOCUMENTS

DE 44 15 736 A1 11/1995
EP 2 428 862 A1 3/2012

(Continued)

OTHER PUBLICATIONS

Nilsson et al., "Trajectory Planning with Miscellaneous Safety Critical Zones," International Federation of Automatic Control, 2017, pp. 9083-9088, vol. 50-1, Elsevier.

*Primary Examiner* — William D Titcomb
(74) *Attorney, Agent, or Firm* — Maginot, Moore & Beck LLP

(57) ABSTRACT

A method is disclosed for determining a trajectory, according to which a mobile device is intended to move in the surroundings along one or multiple possible specified movement paths. The method includes providing a set of different monitoring zones, wherein each of the different monitoring zones respectively defines an area around the mobile device in which area the mobile device monitors or is intended to monitor the surroundings. A monitoring zone configuration, each comprising a predetermined monitoring zone of the set of different monitoring zones, is assigned to the mobile device according to a specified assignment criterion depending on a velocity of the mobile device. The method also includes providing a permissibility criterion indicating a permissible monitoring zone from the set of different monitoring zones. The method further includes determining a sequence of critical velocities for the mobile device based on the set of different monitoring zones. The critical velocities each indicate a maximum permissible velocity for the mobile device for a respective monitoring zone configuration. In addition, the method includes determining the trajectory based on the sequence of critical velocities and based on the permissibility criterion, in particular as part of an optimization. Further, the method includes providing the trajectory, and in particular causing the mobile device to move according to the trajectory.

14 Claims, 6 Drawing Sheets

(58) Field of Classification Search
USPC .................................................. 382/110, 100
See application file for complete search history.

(56) References Cited

U.S. PATENT DOCUMENTS

| | | | | |
|---|---|---|---|---|
| 2016/0236347 | A1* | 8/2016 | Shikina | B25J 9/162 |
| 2017/0075027 | A1* | 3/2017 | Rothenberger | G01S 17/42 |
| 2017/0358212 | A1* | 12/2017 | Godwin | H04K 3/90 |
| 2019/0160675 | A1 | 5/2019 | Paschall, II et al. | |
| 2020/0283128 | A1* | 9/2020 | Yamada | G08G 5/55 |
| 2024/0331167 | A1* | 10/2024 | Van Duijkeren | G05D 1/622 |
| 2025/0118214 | A1* | 4/2025 | Tamura | G08G 5/34 |

FOREIGN PATENT DOCUMENTS

| | | | |
|---|---|---|---|
| EP | 2 952 928 | A1 | 12/2015 |
| EP | 3 059 650 | A1 | 8/2016 |
| WO | 2017/050358 | A1 | 3/2017 |

* cited by examiner

METHOD FOR DETERMINING A TRAJECTORY FOR A MOBILE DEVICE

This application claims priority under 35 U.S.C. § 119 to patent application no. DE 10 2023 203 060.8, filed on Apr. 3, 2023 in Germany, the disclosure of which is incorporated herein by reference in its entirety.

The present disclosure relates to a method for determining a trajectory, along which a mobile device, e.g. a robot or an at least partially automated guided vehicle, is intended to move in the surroundings, a computing unit, and a computer program for performing said method, as well as a mobile device.

BACKGROUND

Mobile devices, in particular robots, drones or at least partially automated guided vehicles such as AGVs ("Automated Guided Vehicles") are used in various areas. Such mobile devices typically move along a trajectory or movement path in surroundings such as a home, a garden, a factory floor or on the road, in the air or in water. The trajectory is, e.g., planned or determined to be as short as possible if a specific destination is intended to be reached. Obstacles or objects in the vicinity are intended be taken into account in this context. It is also often desired that the mobile device reaches a specific destination as quickly as possible.

SUMMARY

Proposed according to the disclosure are a method for determining a trajectory, a computing unit, and a computer program for performing said method, as well as a mobile device having the features set forth below. Advantageous embodiments are also set forth in the following description.

The disclosure deals with mobile devices that move or are intended to move along a trajectory in the surroundings. In this context, a trajectory in particular comprises a movement path and a velocity profile along the movement path. The trajectory can, for example, comprise positions and/or orientations of the mobile device and additionally a velocity profile, e.g. times at which these positions and/or orientations should apply. A certain velocity along or on the movement path is specified thereby. This velocity can also be variable along the movement path, e.g. lower on curves than on straight sections. One or multiple possible movement paths can be specified in this case. The trajectory should then move along one (then only the velocity is important) or one of the several movement paths (then a selection can be made).

Examples of such mobile devices include robots and/or drones and/or partially or fully automated guided vehicles (on land, water, or in the air). Robots include, for example, household robots such as vacuum and/or mopping robots, floor or street cleaning devices, or lawn mowing robots, but also other so-called service robots, as well as vehicles that are guided at least partially automatically, e.g. passenger transport vehicles or goods transport vehicles (including what are referred to industrial trucks, e.g. in warehouses, including automated forklift trucks), but also aircraft (referred to as drones or watercraft). Other possible mobile devices are parts of robots, e.g. a robot arm comprising a manipulator.

Generating movements at a minimum duration along, e.g., a specific movement path is a problem that frequently needs to be solved in this context. A mobile device that performs a task faster is generally more efficient, so fewer mobile devices are needed for operations. For automated guided vehicles (AGVs), which usually travel in straight lines on reserved lanes, the maximum velocity of the respective AGV is generally the most important criterion. When using robot arms, where the problem is very similar in principle, it becomes much more difficult due to the additional complexity of the kinematics and dynamics. Mobile devices that work in complex surroundings are generally unable to operate continuously at top velocity. This raises the question of how to determine minimum-time trajectories.

Another aspect to be considered when determining trajectories for such mobile devices concerns safety monitors. In this context, it is understood that a mobile device such as an AGV has the ability to detect the surroundings and, in particular, to recognize objects or obstacles. This is for safety reasons, for example, to avoid collisions between the mobile device and obstacles. For example, a distance from obstacles in the surroundings can be detected, e.g. using lidar or a lidar sensor. Various monitoring zones can be defined in this context, whereby each of the various monitoring zones defines an area around the mobile device, preferably in the direction of travel, in which area the mobile device is monitoring or is intended to monitor the surroundings. If an obstacle is detected in a currently assigned monitoring zone, then an action is typically performed. This action can, e.g., be a maneuver such as braking or swerving the mobile device in order to prevent a collision.

Depending on the velocity of the mobile device, one or multiple different monitoring zones can be assigned to the mobile device. The velocity can comprise a longitudinal velocity, a lateral velocity or an angular velocity, or any combination thereof. The monitoring zones to be assigned can also depend on the type of velocity. For example, when cornering, monitoring zones can be larger in the direction of the bend. A steering angle of the mobile device, if adjustable, can also have an influence on the monitoring zone to be assigned. It should be mentioned in this context that the monitoring zones may, e.g., only be two-dimensional (2D), but can also be three-dimensional (3D).

Whereas the velocity of the mobile device (at least up to maximum velocity) can generally change at will, i.e. continuously, the monitoring zones are of a discrete nature. This means that the assigned monitoring zones do not change for a certain velocity range of the mobile device, but do change abruptly if a certain velocity threshold is exceeded. For example, the monitored area is then significantly extended. One reason for this discrete nature is, for example, that only a certain number of different monitoring zones need to be taken into account when evaluating the detection of obstacles, which allows faster processing. This type of monitoring zone is also established in the field of robotics and is the most frequently used approach. It should also be noted that the choice of a finite number of zones used by algorithms to check for possible collisions helps to reduce the complexity of the safety case for the entire robot system.

However, in the case of a mobile device that is assigned such monitoring zones or uses such monitoring zones, when determining a trajectory there is a risk that a trajectory will be determined in which the mobile device later performs an unnecessary action due to an obstacle detected (at a certain distance). This would lead to unnecessary delays or even longer interruptions, which runs counter to the goal of the fastest possible trajectory.

Against this background, it is proposed that a set of different monitoring zones be provided in order to determine such a trajectory. In particular, these may be those monitoring zones that can or should be used for the mobile device in question. The number and type or size of the various monitoring zones can vary, depending on the type of mobile device, the type of monitoring functionality implemented, or the type of the surroundings in which the mobile device is intended to move. As mentioned, each of the different monitoring zones defines an area around the mobile device in which area the mobile device is monitoring or is intended to monitor the surroundings. An assignment criterion is provided, according to which a monitoring zone configuration is or is going to be assigned to the mobile device as a function of a velocity of the mobile device; a monitoring zone configuration comprises a predetermined monitoring zone of the set. A monitoring zone configuration can, for example, comprise a larger monitoring zone at higher velocities than at lower velocities. It is useful if the assigned monitoring zone is always selected starting from the mobile device (or a sensor), typically approximately in the direction of travel. Regardless of the type of assignment, however, a discretization will exist.

Furthermore, a permissibility criterion is provided that specifies a permissible zone from the set of different monitoring zones. In this case, a user can, e.g., specify which monitoring zone is intended to be accepted, e.g. also depending on the surroundings or the possible movement paths. This can be used, for example, to ensure that only those monitoring zones (and therefore also monitoring zone configurations) are permitted for which it can be guaranteed, or at least assumed, that the aforementioned action of the mobile device will not be triggered.

Furthermore, a sequence of critical velocities for the mobile device is then determined based on the set of different monitoring zones, preferably also based on the one or multiple possible specified movement paths. In particular, the one or multiple possible specified movement paths specify possible velocities for the mobile device; for example, a certain ratio of longitudinal to angular velocity can be specified for a curve or cornering. One or multiple possible steering angles for the mobile device can also be specified by the one or multiple possible specified movement paths. Regarding vehicles in which the steering angle is adjustable, a certain curve leads to, e.g., a certain required steering angle.

The critical velocities in this case indicate the maximum permissible velocity for the mobile device for each monitoring zone configuration. As mentioned, a monitoring zone configuration applies to a certain velocity range; a maximum velocity can then be determined there. During travel along a curve, the velocity can, e.g., have a longitudinal component and an angular component.

The trajectory is then determined based on the sequence of critical velocities and based on the permissibility criterion, in particular as part of an optimization or an optimization method. For this purpose, a selected, in particular maximum, critical velocity can be determined from the sequence of critical velocities so that a monitoring zone configuration to be assigned to the selected critical velocity satisfies the permissibility criterion. For example, a maximum velocity is thereby found, at which it can be assumed that the action of the mobile device will not be triggered. The trajectory is then determined based on the selected critical velocity.

The trajectory is then also provided, and the mobile device can in particular be prompted to move according to the trajectory. Based on the trajectory, movement control variables (e.g. control variables for the drive system such as torques, steering specifications and the like) can be determined and provided for the mobile device, in particular the mobile device can also be controlled based on the movement control variables. For example, a control or regulation unit for controlling a drive system can be provided for this purpose.

In programming terms, a computing unit according to the disclosure, e.g. a control device or a control unit of a mobile device, is in particular configured to perform a method according to the disclosure.

The disclosure also relates to a mobile device, e.g. a robot, a drone or an at least partially automated guided vehicle (e.g., an AGV), which is configured to receive a trajectory or movement control variables. The mobile device then comprises a drive system and a control or regulation unit for controlling the drive system based on the trajectory and/or the movement control variables. The mobile device can also comprise a computing unit according to the disclosure. As already mentioned, the mobile device can be configured to perform an action (e.g., a braking maneuver) if an obstacle is detected in the monitoring zone configuration currently assigned to the mobile device. For this purpose, the mobile device can also comprise one or multiple sensors or sensor units, e.g. lidar sensors.

The implementation of a method according to the disclosure in the form of a computer program or computer program product comprising program code for performing all of the method steps is also advantageous because this results in particularly low costs, especially if an executing control device is still used for other tasks and is therefore provided in any event. Suitable data carriers for providing the computer program are, in particular, magnetic, optical, and electric storage media, such as hard disks, flash memory, EEPROMs, DVDs, and others. Downloading a program via computer networks (Internet, intranet, etc.) is also possible.

Further advantages and embodiments of the disclosure will emerge from the description and the accompanying drawings.

It is understood that the features specified hereinabove and those to be explained hereinafter can be used not only in the combination indicated in each case, but also in other combinations or on their own, without departing from the scope of the present disclosure.

BRIEF DESCRIPTION OF THE DRAWINGS

The disclosure is thoroughly illustrated schematically in the drawings on the basis of exemplary embodiments and is described hereinafter with reference to the drawings.

DETAILED DESCRIPTION

Figure 1A:
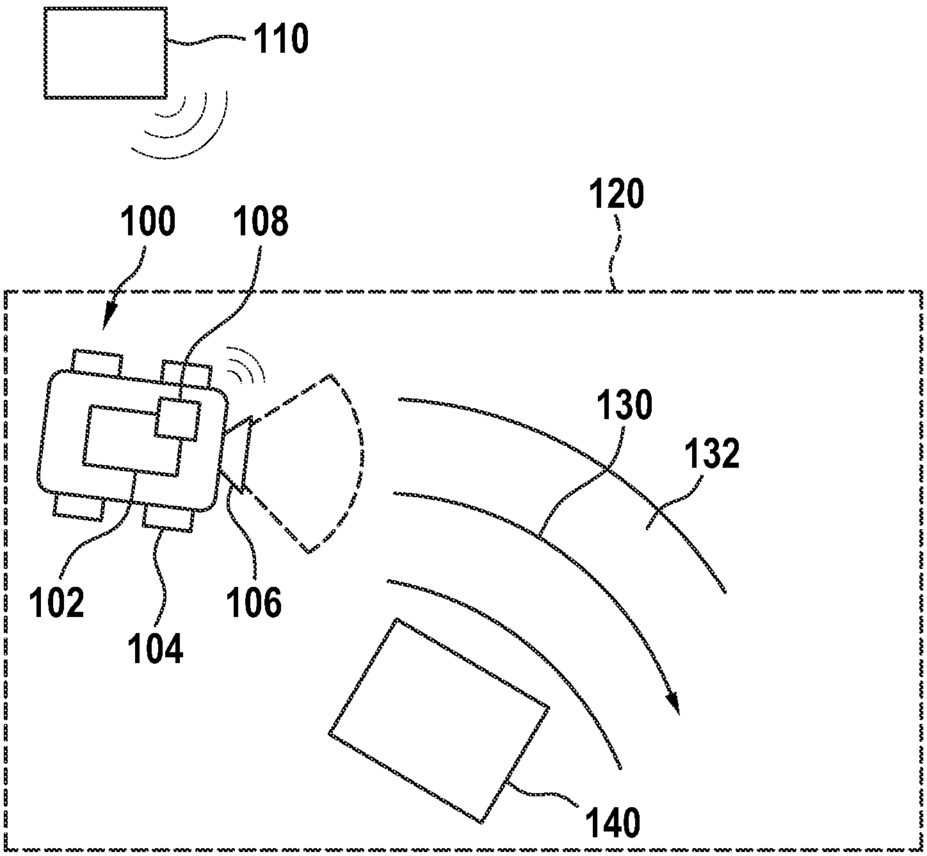
FIG. 1*a* schematically shows a mobile device in the surroundings illustrating the disclosure.

FIG. 1*a* schematically illustrates a mobile device 100 in the surroundings 120, by means of which the disclosure is intended to be explained. For example, the mobile device 100 is a self-propelled vehicle, e.g. an AGV. It is understood that the mobile device can also be of a different type, as explained hereinabove.

The mobile device 100 in this case comprises a computing unit 108 in the form of a control unit, which is connected to the higher-level computing unit 110, e.g. by wireless data transmission, as well as (by way of example) a lidar sensor 106.

The mobile device 100 further comprises a drive system 104 and a control or regulation unit 102 for controlling the drive system 104 based on trajectories or movement control variables.

In the surroundings 120, a possible movement path 132 is indicated by way of example which, e.g., the mobile device 100 can or should follow, i.e., along which it is intended to move. For this purpose, a trajectory 130 can be determined, which not only indicates the movement path to be ultimately followed by the mobile device (there could also be alternative possible movement paths), but also a velocity. An obstacle 140 in the surroundings is also shown by way of example.

Figure 1B:
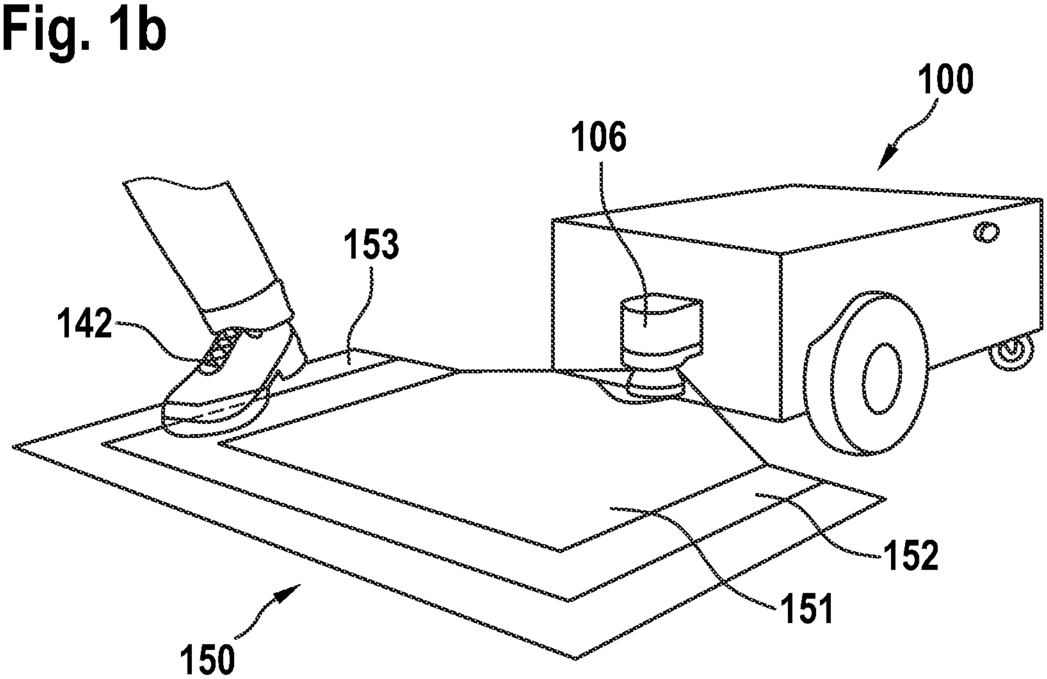
FIG. 1*b* shows another view of the mobile device from FIG. 1*a* in order to explain the disclosure.

FIG. 1*b* shows a perspective view of the mobile device 100 in FIG. 1*a*, whereby a lidar sensor 106 in particular can be seen in this case. The lidar sensor 104 can be used to detect the surroundings or potential obstacles in a certain area 150 around the mobile device 100. By way of example, a foot 142 is shown as an obstacle. There may be various monitoring zones in area 150, and monitoring zones 151, 152, 153 are designated by way of example. In particular, there is always a specific monitoring zone that is observed, e.g. rectangle 151. The monitoring zone 152, on the other hand, can include the rectangle of the monitoring zone 151 and the U-shaped area adjacent to it. The monitoring zone 153 can, for example, also include the other U-shaped area on the very outside. It should be noted that each monitoring zone is preferably an independent zone and not a combination of separate zones. In general, different monitoring zones can overlap (as shown in FIG. 1*b*), but can also be separate from each other. Preferably, the monitoring zones are set or specified such that specific safety standards are complied with, and the mobile device can still come to a standstill when the monitoring zone is triggered and the static obstacle has not been reached. In this case (interpretation of the standard), static objects or obstacles in particular are considered. In practice, monitoring zones can also be more complex, e.g. in the form of any polygon. Depending on the current velocity of the mobile device 100, another of these monitoring zones 151, 152, 153 may be active, i.e., an obstacle detected there triggers an action such as braking. In the example shown, the foot is detected in the monitoring zone 153.

All monitoring zones intended for a specific mobile device and/or specific surroundings can be combined into one set. For example, all the monitoring zones shown in FIG. 1*b* (monitoring zones 151, 152, 153) can form this set. As already mentioned, a monitoring zone configuration can be assigned to the mobile device according to a specified assignment criterion as a function of a velocity, which in each case comprises a predetermined monitoring zone of the set of different monitoring zones. For example, at maximum velocity of the mobile device 100, the monitoring zone 153 shown in FIG. 1*b* could belong to a current monitoring zone configuration, but at low velocity, for example, only the monitoring zone 152 or even only 151. In this case, the mobile device 100 would not perform the action, or it would not be triggered.

An optimization problem can then be solved to determine a trajectory for such a mobile device, which specifies a velocity profile along a movement path. This can be assumed to be possible in principle. As mentioned, however, if the possible velocity that the mobile device can assume here were to be taken as its maximum velocity, there would be a risk that a large monitoring zone configuration would occur, which would unnecessarily lead to an action by the mobile device. It is intended to be described hereinafter how this can be avoided.

Figure 2:
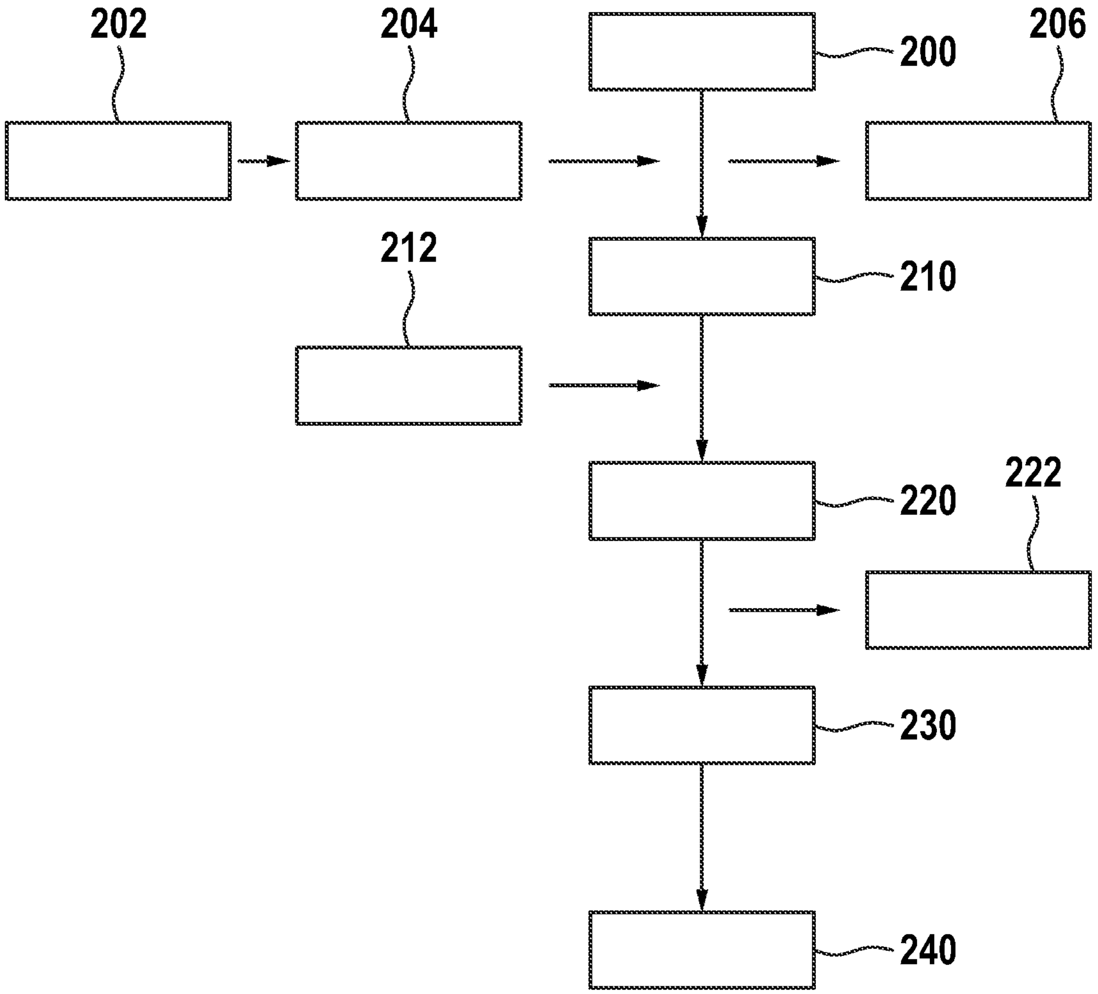
FIG. 2 schematically shows a sequence of a method according to the disclosure in a preferred embodiment.

FIG. 2 shows a sequence of a method according to the disclosure, in a preferred embodiment. In step 200, a set 202 of different monitoring zones is first provided. Each of the different monitoring zones defines an area around the mobile device in which area the mobile device is monitoring or is intended to monitor the surroundings. Such monitoring zones are shown by way of example in FIG. 1*b*. A monitoring zone configuration 206 is assigned to the mobile device according to a specified assignment criterion 204 as a function of a velocity of the mobile device, each monitoring zone comprising a predetermined monitoring zone of the set of different monitoring zones.

Figure 3A:
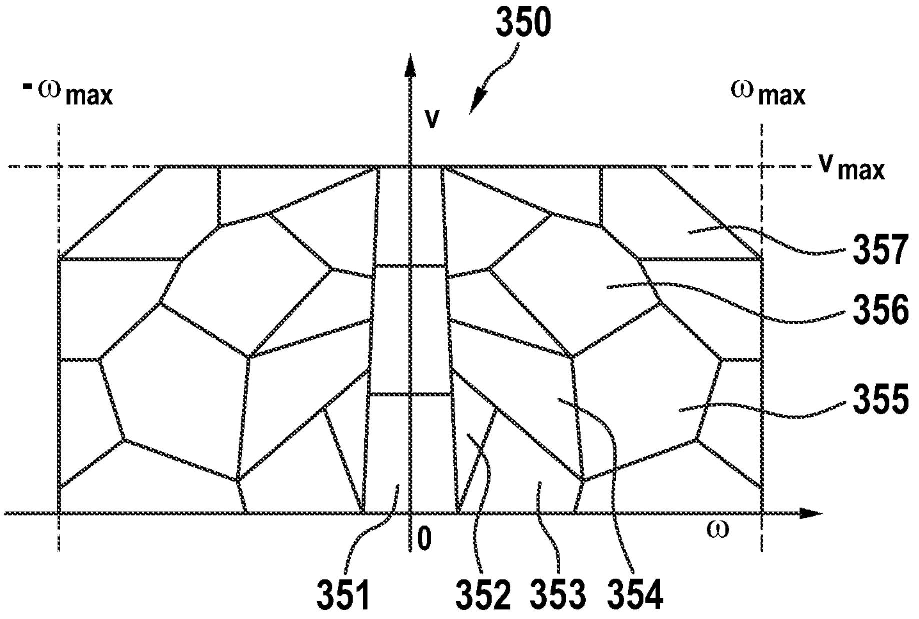
FIGS. 3*a* to 3*d* show diagrams for explaining a method according to the disclosure in a preferred embodiment.

FIG. 3*a* shows, in a diagram, a range 350 which comprises various velocity ranges (here exemplified in 2D). For this purpose, a longitudinal velocity v and an angular velocity ω are shown on the axes, which indicate possible velocities of the mobile device. The origin (0.0) in this case stands for standstill. A maximum longitudinal velocity is labeled vmax and minimum and maximum angular velocity (signed, e.g. moving left and right) are labeled—ωmax and ωmax. Negative values could also be taken into account for the longitudinal velocity. The generally possible velocities of the mobile device are therefore indicated by a point in the diagram that does not exceed the minimum or maximum velocities. It is conceivable that maximum longitudinal velocity and maximum angular velocity cannot be achieved simultaneously.

The range 350 here comprises various velocity ranges, some of which are labeled 351, 352, 353, 354, 355, 356, 357 as examples. The velocity ranges are, for example, convex ranges. Depending on the velocity of the mobile device, it can then be assigned a different monitoring zone, which is specified via a monitoring zone configuration. The same monitoring zone is in this case assigned to each velocity within a velocity range. For example, if the velocity is in the velocity range 351, a smaller monitoring zone will be assigned, as the braking distance will generally be shorter than if the velocity is in the velocity range 357.

It is understood that the present situation is also not limited to the two-dimensional (2D) case, although it is the case in the present context (for the sake of easier illustration). Therefore, velocity ranges can, e.g., only be two-dimensional (2D), but can also be three-dimensional (3D).

In step 210, a permissibility criterion 212 is provided that specifies a permissible monitoring zone from the set 202 of the various monitoring zones. As a result, a user is, e.g., able to specify which monitoring zone is permitted because this is unlikely to trigger an action. For example, monitoring zone 152 could be approved. In other words, the user can specify the monitoring zone so that the mobile device meets a certain safety standard. Nevertheless, the user is motivated, for example, to use the highest possible velocities and rotation rates. Each velocity range in FIG. 3*a*, e.g. 357, is therefore assigned a specific monitoring zone, e.g. 153 (for each sensor), in order to ensure the safety function and, at the same time, enable the fastest journey. It can already be seen that this leads to a restriction of the possible velocities.

However, an examination of whether the permissibility criterion is met will only take place later, as will be explained later.

In step 220, a sequence 222 of critical velocities for the mobile device is then determined based on the set 202 of different monitoring zones, as well as, e.g., also based on one or multiple possible specified movement paths, e.g. the movement path 132 in FIG. 1*a*. The critical velocities indicate the maximum permissible velocity for the mobile device for each monitoring zone configuration.

Figure 3B:
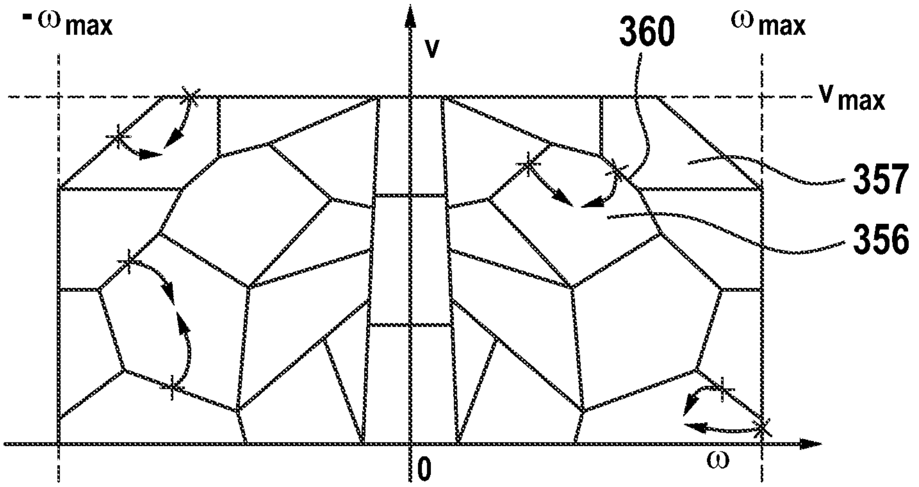

For this purpose, boundary surfaces (or, in 2D, boundary lines or edges) of velocity ranges can be considered first. FIG. 3*b* shows an example of such a boundary surface 360, which lies between the velocity ranges 356 and 356; this boundary surface can be counted as part of the velocity range 356 or the velocity range 357. A valuation function (e.g., a scalar valuation function) can, e.g., be used to perform this assignment. One aim can in this case be to organize the velocity range as follows:

An evaluation function is f, a permissibility criterion is g (a velocity range or the associated monitoring zone is accepted if this is true), there are two velocity ranges z1, z2, and a velocity or a velocity vector is t. Then the following applies:

$$(g(t,z1)==\text{True})\ \text{AND}\ (g(t,z2)==\text{False})\ \text{implies}\ f(z1)>f(z2)$$

In addition, the following applies:

$$(f(z1)\gtrapprox f(z2))\ \text{AND}\ (g(t,z2)==\text{True})\ \text{implies}\ (g(t,z1)==\text{True})$$

and:

$$(f(z1)\gtrapprox f(z2))\ \text{AND}\ (g(t,z1)==\text{false})\ \text{implied}\ (g(t,z2)==\text{false})$$

The preferred monitoring zone or velocity range is therefore one with a lower value. All values (v, ω) within the area are assigned to this velocity range. By assigning edges to velocity ranges (in this case areas), an algorithm can easily check whether the boundary lines have been exceeded or undercut and can therefore directly assign the velocity range in which velocity range the mobile device is located and thus also determine the maximum velocity in a velocity range.

Figure 3C:
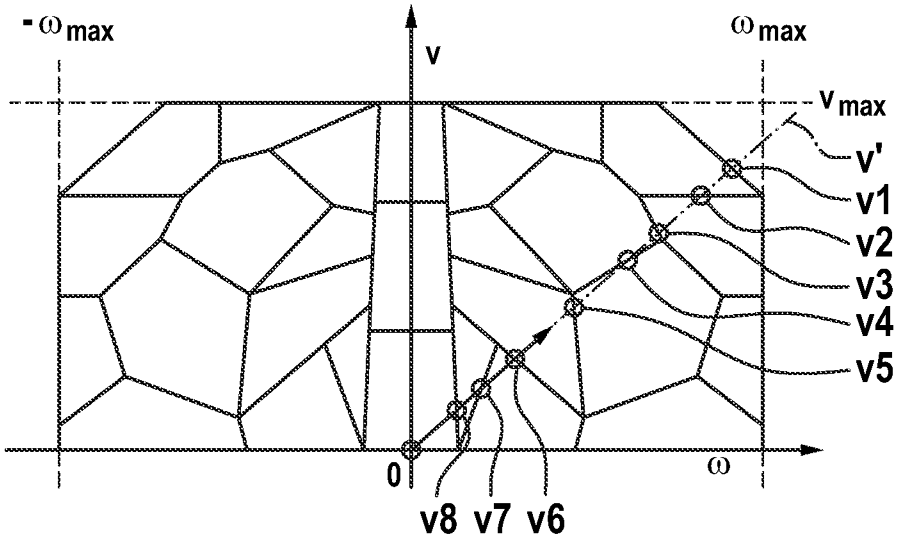

FIG. 3*c* now shows possible velocities with a line v' (along an arrow) that the mobile device can assume for a possible movement path. The possible movement path is, for example, a right-hand curve that requires a certain ratio between longitudinal and angular velocity. As mentioned, the critical velocities each indicate a maximum permissible velocity for the mobile device for one velocity range and thus a monitoring zone configuration. These critical velocities are in this case labeled as points v1 to v8.

In step 230, the trajectory can be determined based on the sequence of critical velocities, whereby in step 232 a selected, in particular maximum, critical velocity can be determined from the sequence of critical velocities, so that a monitoring zone configuration to be assigned to the selected critical velocity satisfies the permissibility criterion.

In the example shown, the velocity ranges 351, 352, 353, for example, can satisfy the permissibility criterion if the monitoring zones assigned to these velocity ranges would not trigger any action for a possible obstacle at a certain distance. The maximum velocity that satisfies the permissibility criterion is therefore, for example, that given by v6. In a step 234, the trajectory can then be determined at this critical velocity v6, for example as part of an optimization, and provided in step 240. It should be mentioned that such a trajectory can only be determined in advance for a certain movement path section, for example; this can then be repeated again and again.

Figure 3D:
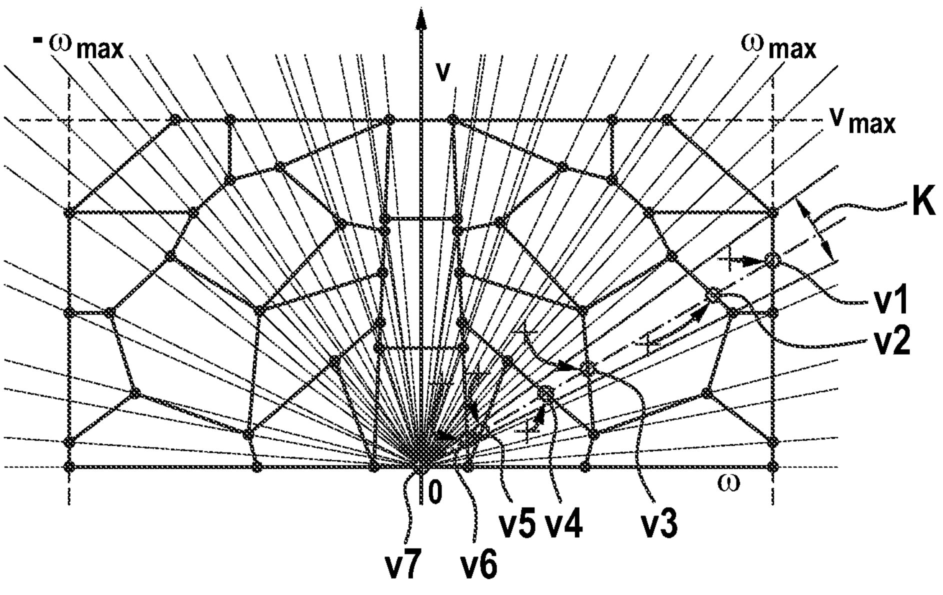

While the above explanations apply generally and are not limited to the 2D case, certain simplifications can be made in the 2D case. In the case of 2D velocity ranges, the local movement path geometry can also be represented by a (signed) curvature K, as shown in FIG. 3*d*. The plane of longitudinal velocity v and angular velocity w can be divided into triangular regions, as indicated by lines through the origin. A surface between two curvature limits can be clearly represented by a lower curvature limit and an upper curvature limit.

Figure 4A:
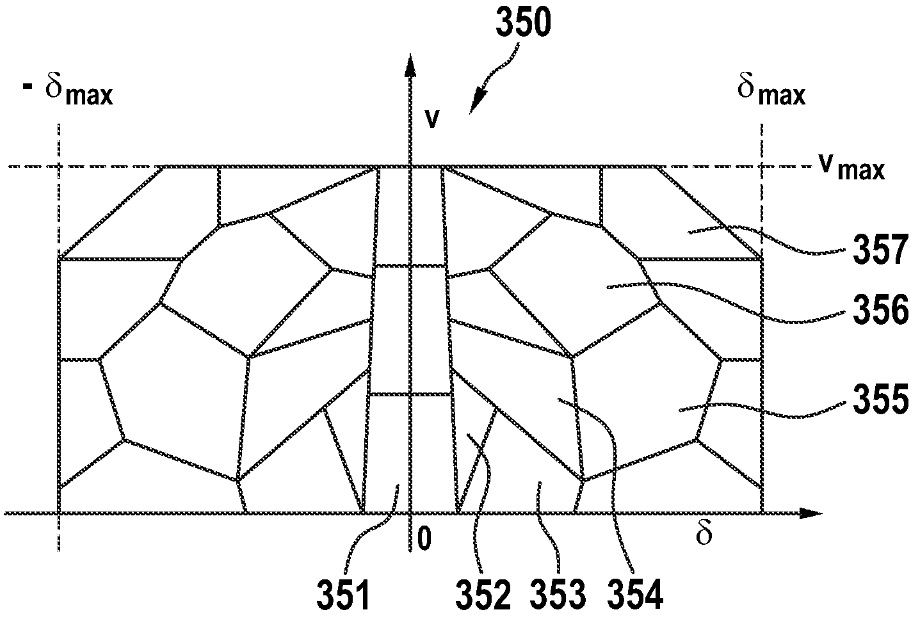
FIGS. 4*a* to 4*d* show diagrams for explaining a method according to the disclosure in a further preferred embodiment.
Figure 4B:
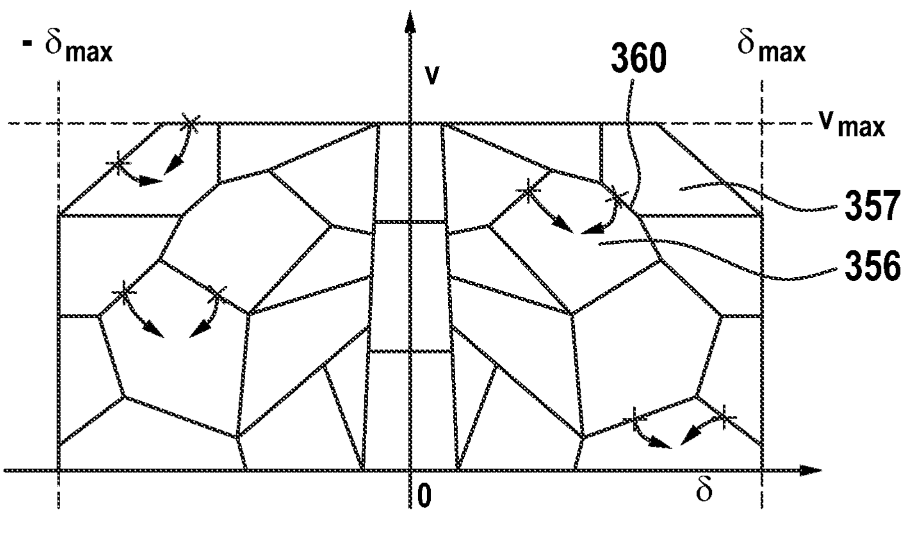

FIGS. 4*a* to 4*d* show diagrams comparable to the diagrams in FIGS. 3*a* to 3*d*. Instead of the longitudinal velocity v and the angular velocity, however, the longitudinal velocity v and a steering angle δ are plotted here. However, the velocity ranges are distributed in the same way, except that only the longitudinal velocity v and the steering angle δ are now relevant to the assignment criterion, as can be seen in FIG. 4*a*.

Figure 4C:
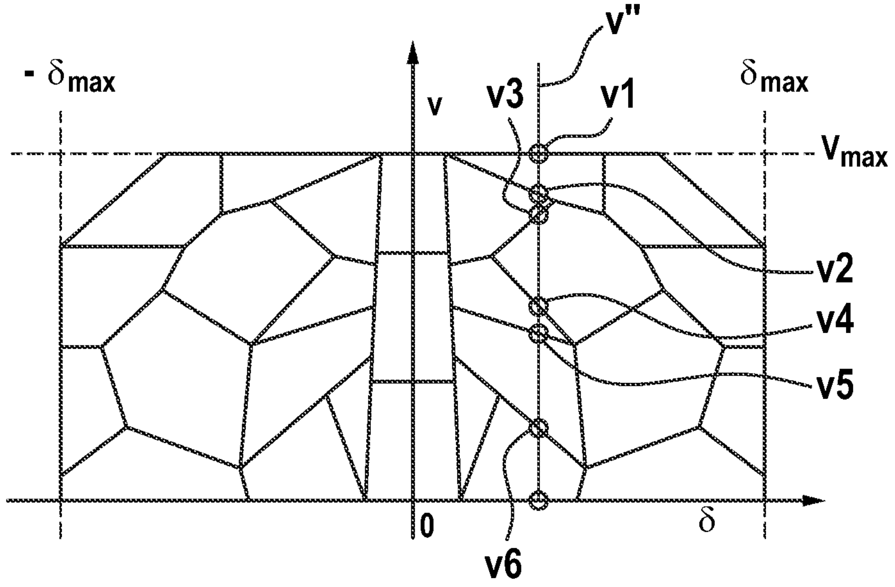
Figure 4D:
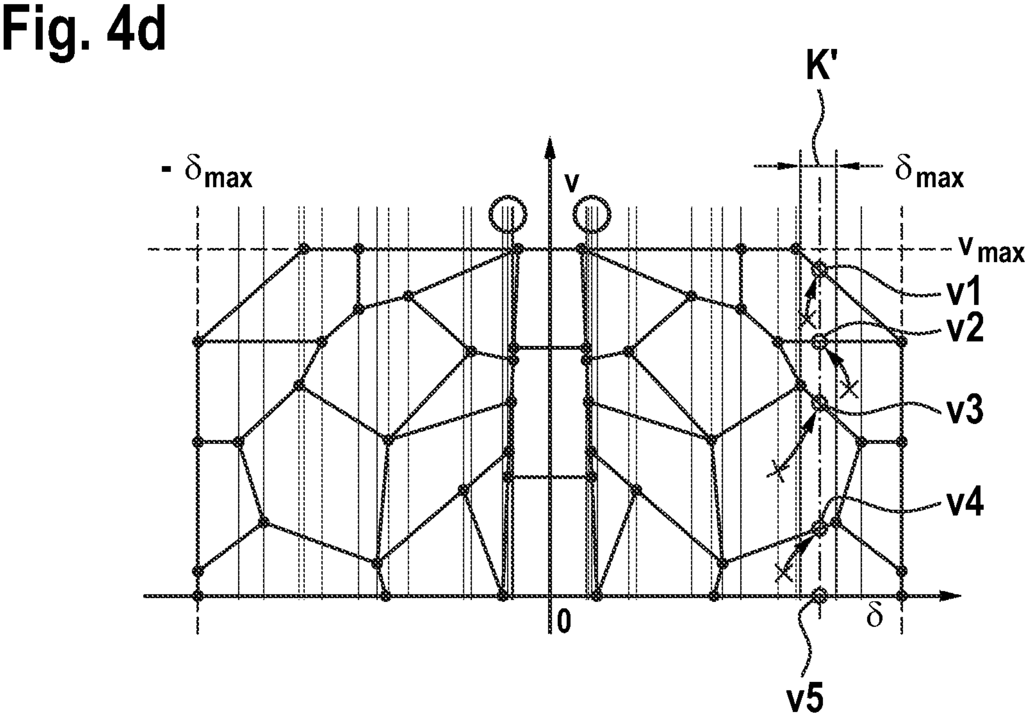

FIG. 4*c* shows that the possible velocities, which are shown by a line v", are parallel to the axis of the longitudinal velocity v because the steering angle itself does not represent a velocity component of its own. This can also lead to a deviation in the assignment of the area to the velocity ranges. FIG. 4*d* also shows that the local movement path geometry can also be represented by a (signed) curvature K' which, however, in this case only covers a certain range of the steering angle, i.e., leaves a certain amount of leeway for, e.g., the steering angle. However, the remaining method sequence of the method can performed in a similar manner.

What is claimed is:

1. A method for determining a trajectory, which includes a movement path and a velocity profile along the movement path, according to which a mobile device is intended to move in surroundings along one or multiple possible specified movement paths, the method comprising:

providing a set of different monitoring zones, wherein each of the different monitoring zones respectively defines an area around the mobile device in which area the mobile device is monitoring or is intended to monitor the surroundings, and wherein a monitoring zone configuration, which respectively comprises a predetermined monitoring zone of the set of the different monitoring zones, is assigned to the mobile device according to a specified assignment criterion depending on a velocity of the mobile device, the mobile device being configured to perform an action in response to an obstacle being detected by the mobile device in the monitoring zone configuration;

providing a permissibility criterion indicating a permissible monitoring zone from the set of different monitoring zones;

determining a sequence of critical velocities for the mobile device based on the set of different monitoring zones, wherein the critical velocities each indicate a maximum permissible velocity for the mobile device for a respective monitoring zone configuration;

determining the trajectory based on the sequence of critical velocities and based on the permissibility criterion in context of an optimization, the determining of the trajectory comprising:

determining a selected critical velocity from the sequence of critical velocities so that a monitoring zone configuration to be associated with the selected critical velocity satisfies the permissibility criterion; and determining the trajectory based on the selected critical velocity; and providing the trajectory, and causing the mobile device to move according to the trajectory.

2. The method according to claim 1, wherein determining the sequence of critical velocities for the mobile device is based on the set of different monitoring zones and based on the one or multiple possible predetermined movement paths.

3. The method according to claim 1, wherein the one or multiple possible specified movement paths each specifies possible velocities for the mobile device.

4. The method according to claim 3, wherein the one or multiple possible specified movement paths furthermore each specifies one or multiple possible steering angles for the mobile device.

5. The method according to claim 1, wherein the velocity of the mobile device comprises at least one of:

a longitudinal velocity, a lateral velocity, and an angular velocity.

6. The method according to claim 1, further comprising:

determining movement control variables for the mobile device based on the trajectory, and providing the movement control variables and/or moving the mobile device based on the movement control variables.

7. A computing unit comprising a processor configured to perform the method according to claim 1.

8. The method according to claim 1, wherein the mobile device includes a robot or an at least partially automated guided vehicle.

9. A mobile device which is configured to obtain a trajectory determined according to the method of claim 1, comprising:

a drive system and a control or regulation unit configured to control the drive system based on the trajectory and/or based on movement control variables, and at least one sensor unit configured to detect obstacles in the surroundings, wherein the mobile device is configured to perform an action when an obstacle is detected in the monitoring zone configuration currently assigned to the mobile device.

10. The mobile device according to claim 9, which is designed as an at least partially automated guided vehicle.

11. The mobile device according to claim 9, which is designed as a passenger transportation vehicle or as a goods transportation vehicle, or as a robot.

12. The mobile device according to claim 9, which is designed as a vacuuming and/or mopping robot, floor or street cleaning device or lawn mowing robot, or as a drone.

13. A non-transitory computer-readable data carrier, on which a computer program is stored, said computer program comprising instructions which, when the computer program is executed by a computer, prompt the computer to perform the method according to claim 1.

14. A method for determining a trajectory, according to which a mobile device is intended to move in surroundings along one or multiple possible specified movement paths, the method comprising:

providing a set of different monitoring zones, wherein each of the different monitoring zones respectively defines an area around the mobile device in which area the mobile device is monitoring or is intended to monitor the surroundings, and wherein a monitoring zone configuration, which respectively comprises a predetermined monitoring zone of the set of the different monitoring zones, is assigned to the mobile device according to a specified assignment criterion depending on a velocity of the mobile device;

providing a permissibility criterion indicating a permissible monitoring zone from the set of different monitoring zones;

determining a sequence of critical velocities for the mobile device based on the set of different monitoring zones, wherein the critical velocities each indicate a maximum permissible velocity for the mobile device for a respective monitoring zone configuration;

determining the trajectory based on the sequence of critical velocities and based on the permissibility criterion in context of an optimization, the determining of the trajectory based on the sequence of critical velocities comprising:

determining a maximum critical velocity from the sequence of critical velocities so that a monitoring zone configuration to be associated with a selected critical velocity satisfies the permissibility criterion; and determining the trajectory based on the selected critical velocity; and providing the trajectory, and causing the mobile device to move according to the trajectory.

* * * * *